United States Patent
Chung

(10) Patent No.: US 7,182,178 B2
(45) Date of Patent: Feb. 27, 2007

(54) BRAKE CASTER WITH STROKE ADJUSTMENT MECHANISM

(75) Inventor: Chia-Liang Chung, Hsin-Chuang (TW)

(73) Assignee: Ching-Sung Lin, Taipei Hsien (TW)

( * ) Notice: Subject to any disclaimer, the term of this patent is extended or adjusted under 35 U.S.C. 154(b) by 145 days.

(21) Appl. No.: 11/018,252

(22) Filed: Dec. 22, 2004

(65) Prior Publication Data

US 2006/0131110 A1    Jun. 22, 2006

(51) Int. Cl.
*B60B 33/04* (2006.01)
*B60T 1/00* (2006.01)
*F16D 65/46* (2006.01)
*F16D 65/42* (2006.01)

(52) U.S. Cl. .................. 188/1.12; 188/29; 188/19; 188/79.51; 188/196 M

(58) Field of Classification Search ............... 188/1.12, 188/16, 19, 20, 29, 31, 79.51, 196 M, 196 B, 188/196 BA; 16/35 R
See application file for complete search history.

(56) References Cited

U.S. PATENT DOCUMENTS 4,722,114 A * 2/1988 Neumann .................. 16/35 R
5,774,936 A * 7/1998 Vetter ........................ 16/35 R
6,336,524 B1 * 1/2002 Van Loon et al. ......... 188/1.12
6,584,641 B1 * 7/2003 Milbredt .................... 188/1.12

FOREIGN PATENT DOCUMENTS

DE            19632917 A1 *    2/1997

* cited by examiner

*Primary Examiner*—Thomas Williams
(74) *Attorney, Agent, or Firm*—Rabin & Berdo, P.C.

(57) ABSTRACT

Disclosed is a brake caster with stroke adjustment mechanism, including a retainer, a king pin, a catch spring, a catch/release button, a plunger block, and a brake pad. The upper part of the king pin is fitted with the spring coil; the catch/release button is fitted with the catch spring; and a threaded polygonal lock nut is placed over the catch/release button in the hollow space of the plunger block, which has the brake pad installed on the bottom end; the plunger block being coupled with the catch/release button is slipped onto the king pin lengthwise along the threads. By twisting the plunger block in and out around the neck of the plunger block, the stroke distance can be adjusted according to different levels of rubber on the wheel, so that the service life of the caster can be effectively prolonged without numerous replacements of the wheels.

4 Claims, 6 Drawing Sheets

BRAKE CASTER WITH STROKE ADJUSTMENT MECHANISM

BACKGROUND OF THE INVENTION

1. Field of the Invention

The present invention relates to a brake caster for hand carts, in particular to a brake caster installable on hand carts, which uses a stroke adjustment mechanism to tune the brake so as to extend the service life of the caster without numerous replacements of the wheels.

2. The Related Art

The hand carts are used in shopping malls, large plazas, and airports, which provide a convenient means of transporting bulky or heavy merchandise, cargo or luggage. To steer and stop the hand carts efficiently, many are equipped with hand brakes. The hand brake actually uses the brake casters installed on the bottom of the hand cart, and mechanically connected through a connecting means to a handle bar disposed above the rack, to allow the user to control the brake with the hands. Once the handle bar is depressed, the brake is released and the hand cart is then free to move forward or backward, but when the external force is removed from the handle bar, the handle bar automatically springs back and the mechanical force is transferred onto the brake, which will then press against the rubber of the wheel to bring the hand cart to a standstill.

After the hand cart is operated for certain time, the center portion on the wheel of the caster, usually made of solid rubber or PU material, is gradually worn out by repeated grinding of the rubber. As a result of that, the gap between the brake and the wheel is widened to affect the braking effect, or in the worst case the brake will have no effect at all. To repair the hand cart under these conditions, the conventional way simply to replace the wheels of the casters, but numerous replacements of the wheels will definitely increase the operation cost.

SUMMARY OF THE INVENTION

The primary objective of the present invention is to provide a brake caster that incorporates a stroke adjustment mechanism to allow the user to tune the brakes of a hand cart according to different levels of rubber on the wheels, so that the service life of the casters can thus be prolonged without numerous replacements of the wheels, and the operation costs can be considerably reduced.

One characteristic of the invention is the innovative use of a catch/release button in the adjustment of the brake. The catch/release button is formed with a flange, a blind hole or mouth in the center that is linked to the hollow axis, and multiple lock pins extending downward from the back side of the flange, which are to be fitted into corresponding pin holes located on the inner ring of the brake pad connected at the bottom of the plunger block. If the lock pins are engaged, the braking distance is locked; otherwise the plunger block can be twisted in and out around the king pin lengthwise to adjust the distance between the brake pad and the rim of the wheel.

Another characteristic of the invention is the structure of the king pin with outward threads around the neck, and the plunger block with inward threads on the inner wall, which is connected with a brake pad on the bottom end. This structure allows the user to adjust the stroke distance by twisting the plunger block in and out around the king pin lengthwise.

The brake caster of the present invention is otherwise very similar to a standard caster with a swivel module, a hub and a wheel, but the unique structure of the hub is directly related to the braking mechanism, which includes a spring coil, a retainer, a king pin, a polygonal lock nut, a catch spring, a catch/release button, and a plunger block.

The plunger block is coupled to the king pin by means of the threaded connection, and the king pin is fixed in the center of the swivel module by the retainer. The position of the plunger block relative to the king pin lengthwise is changed every time when the plunger block is twisted around the king pin lengthwise, through which the stroke distance between the brake pad and the rim of the wheel can be adjusted.

When the bottom of the catch/release button is depressed, the lock pins are disengaged from the pin holes to cause the catch/release button to be separated from the plunger block. As a result, the plunger block can be twisted in and out around the king pin lengthwise to adjust the stroke distance between the brake pad and the wheel. Once the stroke adjustment is finished, the catch/release button automatically springs back to latch on the plunger block again by rebounding force of the catch spring, so the plunger block is fixed in new position relative to the rim of the wheel.

When assembling the hub, the catch spring is first placed into the hollow axis of the catch/release button, which is then inserted through the mouth of the plunger block to have one section protruding from the bottom hole. Then, a polygonal lock nut is fitted into the polygonal ring on the inner walls of the plunger block and over the catch/release button. The upper part of the king pin is then fitted with a spring coil through the narrow end, and then inserted through the center hole of the retainer and the polygonal lock nut to reach the catch spring. The plunger block is then slipped onto the king pin lengthwise along the threads.

When an external force is applied on the bottom of the catch/release button, the lock pins on the catch/release button are disengaged from the pin holes of the plunger block to allow the plunger block to be separated from the catch/release button, so that the plunger block can be twisted in and out around the king pin lengthwise. When that force is removed the catch/release button automatically springs back by rebounding force of the catch spring, and the catch/release button is once again latched with the plunger block.

The king pin has outward threads on the outer wall, and the plunger block is fitted with a polygonal lock nut that has inward threads on the inner wall, so that the plunger block can be slipped onto the king pin along the threads to adjust the position of the brake pad. The stroke distance can thus be appropriately adjusted according to different levels of rubber on the wheel, so that the service life of the caster can be prolonged without numerous replacements of the casters and wheels.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
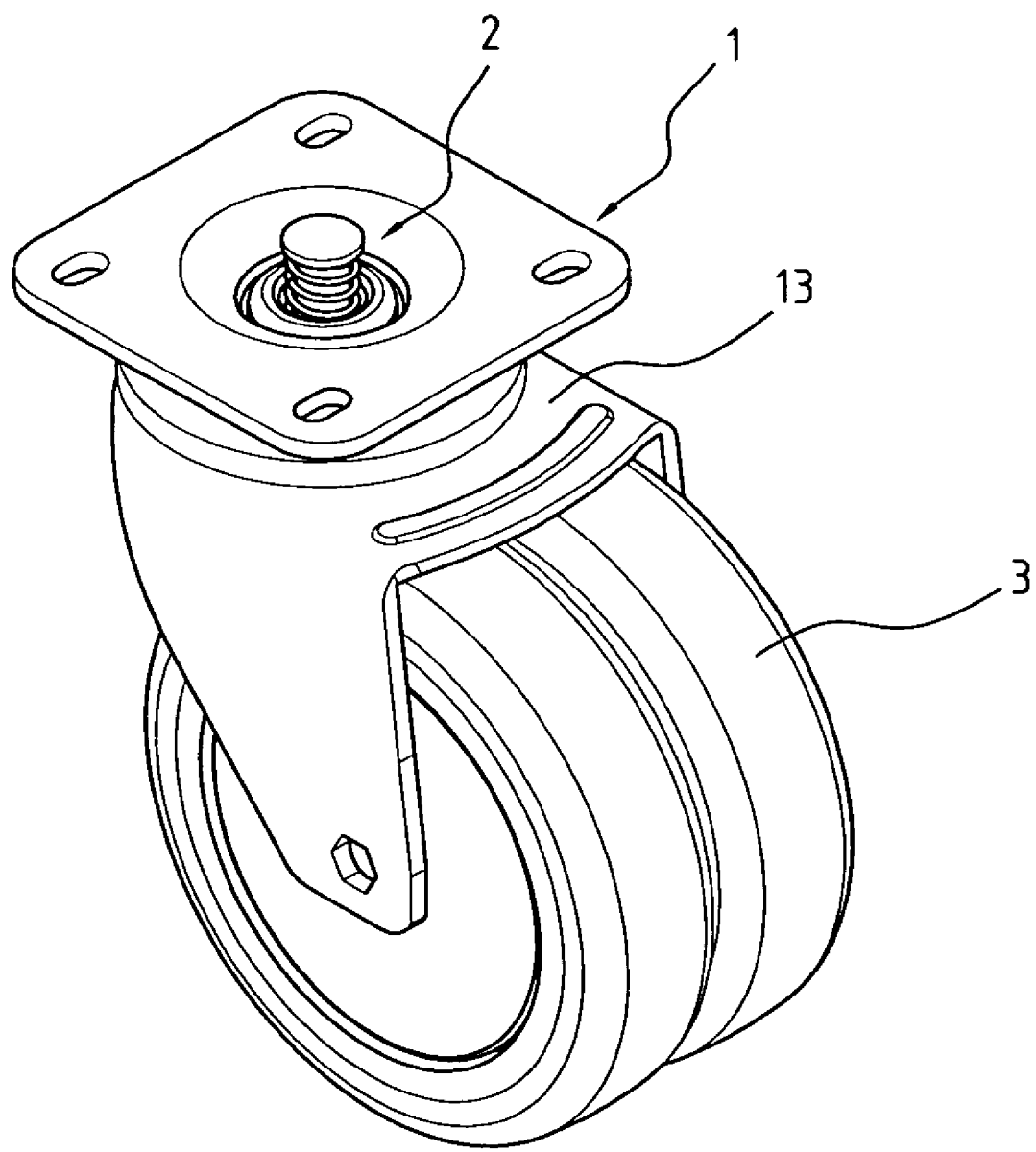
FIG. 1 is a perspective view of a brake caster according to the present invention.

Referring to FIG. 1, a brake caster constructed in accordance with the present invention comprises a swivel module 1 formed with a top plate 11, two raceways 12, 13 with two layers of ball bearings 15, 16, a hub 2, two fork legs (not labeled) on two sides, and a wheel 3 fixed between the two fork legs.

Figure 3:
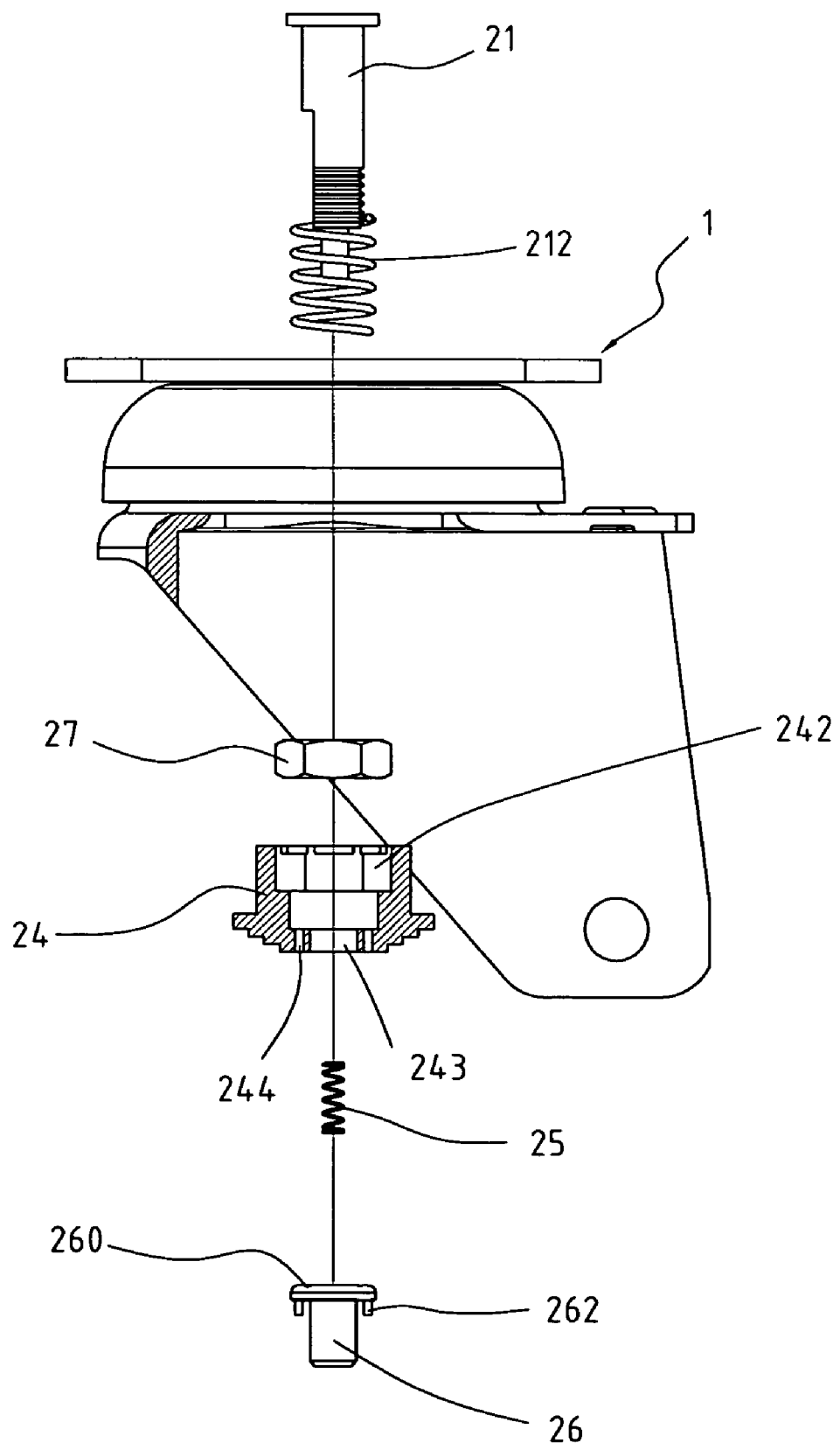
FIG. 3 is a side elevational view showing the components of the assembly of the plunger block and the catch/release button.

Referring to FIG. 3, the swivel module 1 includes a base plate 14, a lower raceway 13, an upper raceway 12, and a top plate 11 each being stacked over the other, where the two raceways 12, 13 and the base plate 14 together forms the traveling paths for the two layers of ball bearings 12, 13, together forming the yoke.

The hub 2 of the caster is the main focus of the present invention, and the rest of the components are very similar to those found in a standard caster. Since their structures and functions have been amply covered by other papers, the topic will not be discussed in the present disclosure.

The structure of the hub 2, as shown in FIG. 3, is directly related to the braking mechanism of the caster, which includes a retainer 22, a spring coil 23, a king pin 21, a catch spring 25, a plunger block 24 and a catch/release button 26.

The two layers of ball bearings 12, 13 disposed in between the upper raceway 12, lower raceway 13 and base plate 14 enable the lower part of the caster including the fork legs and the wheel 3 to turn in a direction different from the top plate 11 that carries the load of the hand cart, so that the user is able to steer the hand cart quite easily.

Figure 2:
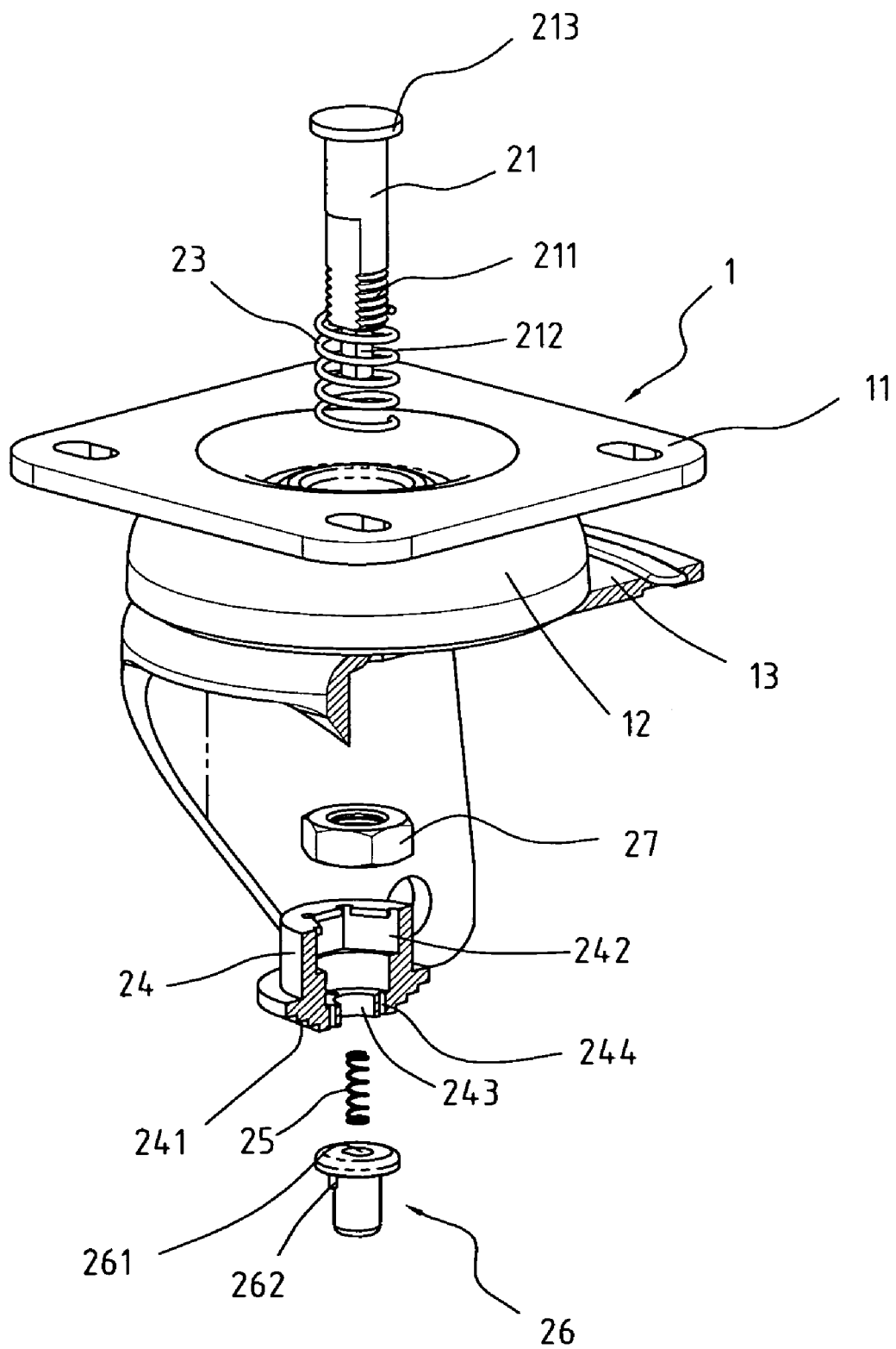
FIG. 2 is an exploded view, partially broken, of the brake caster of the present invention, showing a braking mechanism comprising a king pin, a plunger block, and a catch/release button.

Referring back to FIGS. 2–4, the retainer 22 is inserted through a center hole of the yoke. The fork legs and the wheel 3 are connected by a shaft passing through the center of the wheel 3.

The king pin 21 is formed with a cap 213 over the top, and a narrow end 212 on the other side, and outward threads 211 around the neck portion. When assembling the king pin 21, the spring coil 23 is first slipped through the narrow end 212 onto the upper part of the king pin 21 until the spring coil 23 is stopped by the cap 213.

The plunger block 24 is formed in the shape of a cylinder with mouth opening on top. The hollow axis is used to hold the catch/release button 26 and a polygonal shaped retainer 242, which has inward threads on the inner wall. The bottom part is connected by a cone-shaped brake pad 241 with step-like structure on the outer surface. Also, there is a hole 243 in the center of the brake pad 241 and multiple pin holes 244 on the inner ring.

The catch/release button 26 is also a cylindrical body with a flange 260 on top and a blind hole 261 in the center, and multiple lock pins 262 being arranged in form of a ring on the back side of the flange 260, extending downward, which are to correspond to pin holes 244 on the plunger block 24.

The catch spring 25 is inserted into the hollow axis of the catch/release button 26 when assembled.

In order to create threads on the inner walls of the plunger block 24 and to facilitate the production process, the inner walls of the plunger block 24 near the mouth opening are indented with a polygonal ring 242 and a polygonal lock nut 27 having inward threads on the inner wall is fitted into that space, so that the polygonal lock nut 27 is secured by the walls of the plunger block 24 and the retainer 22 when assembled. This allows the plunger block 24 to be slipped onto the king pin 21 lengthwise to adjust the stroke distance between the brake pad 241 and the wheel 3.

When assembling the hub 2, the spring coil 23 is first inserted through the narrow end 212 onto the king pin 21, so that the spring coil 23 is in contact with the cap 213 on the top end and the anchoring fin 221 on the bottom end. Then the king pin 21 is inserted through the center of the retainer 22, which is already assembled with the yoke.

Figure 4:
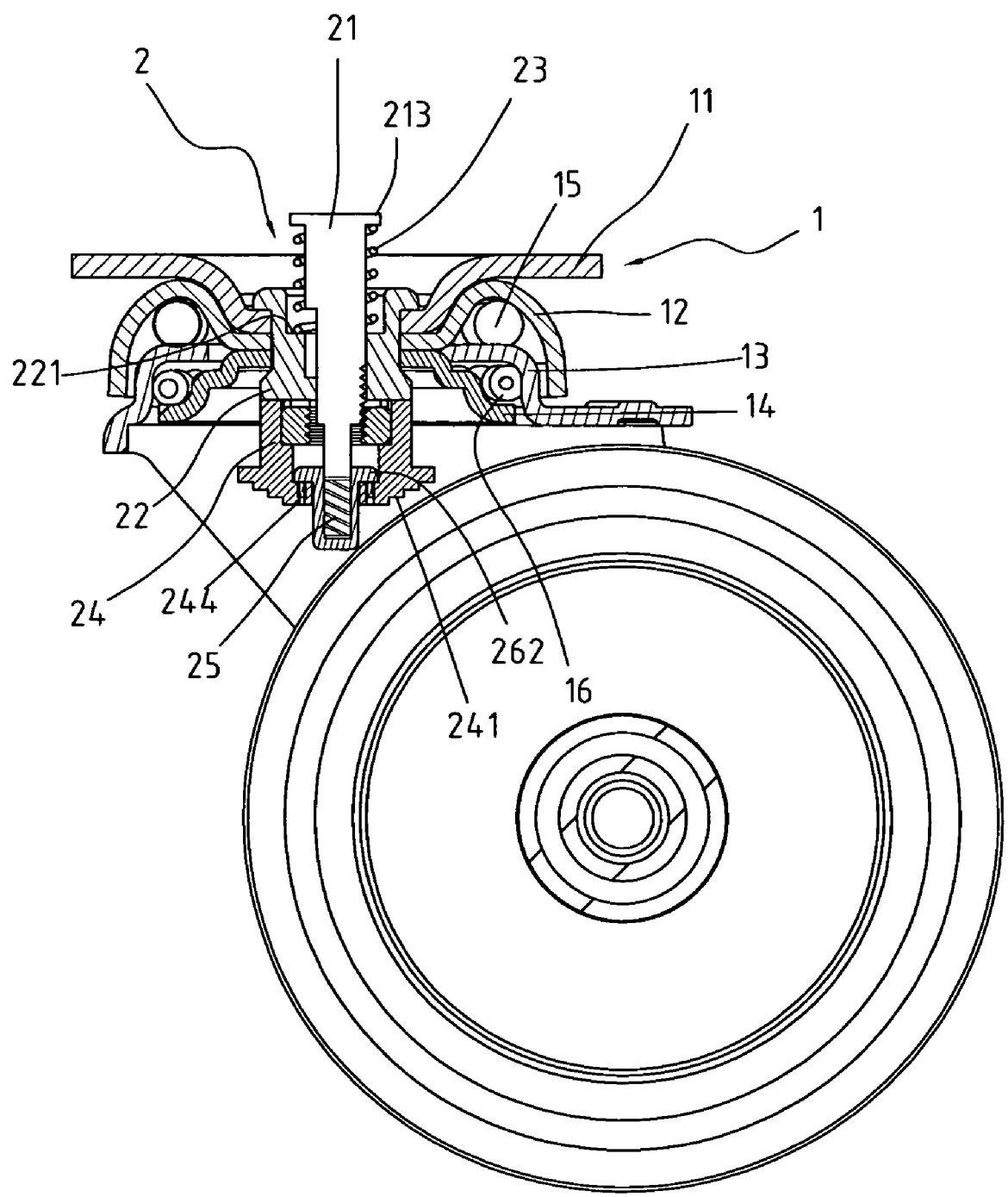
FIG. 4 is a cross-sectional view of a fully assembled brake caster with wheel.
Figure 5:
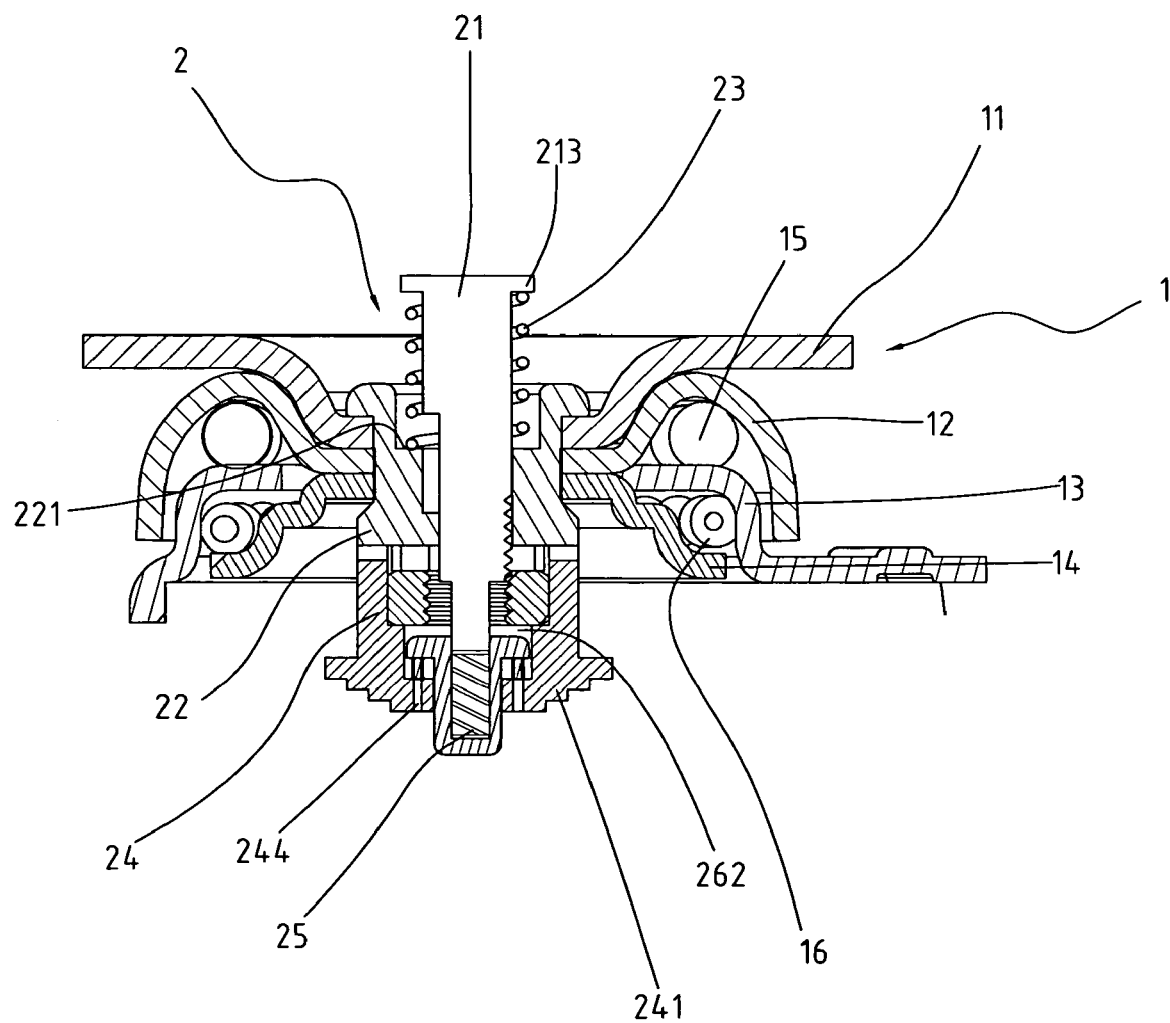
FIG. 5 is a cross-sectional view of the swivel module and hub assembled.

The catch spring 25 is inserted through the blind hole 261 and lodged in the hollow axis of the catch/release button 26. Then, the catch/release button 26 is inserted through the mouth of the plunger block 24 to have one section protruding from the bottom hole, so that the lock pins 262 are fitted into respective pin holes 244 on the inner ring of the brake pad 241 connected onto the bottom end of the plunger block 24. Then, the polygonal lock nut 27 is fitted into the polygonal space 242 directly above the catch/release button 26. The partially assembled plunger block 24 is then slipped through the narrow end 212 onto the king pin 21 lengthwise along the threads 211 as shown in FIG. 4. The swivel module 1 is assembled with the hub 2 as shown in FIG. 5.

The top plate 11 of the brake caster as shown in FIG. 4 is designed to attach onto the bottom chassis of the hand cart, and the top of the king pin 21 is connected to the handle bar of a hand cart through a connecting means (not shown in the drawings).

Figure 6:
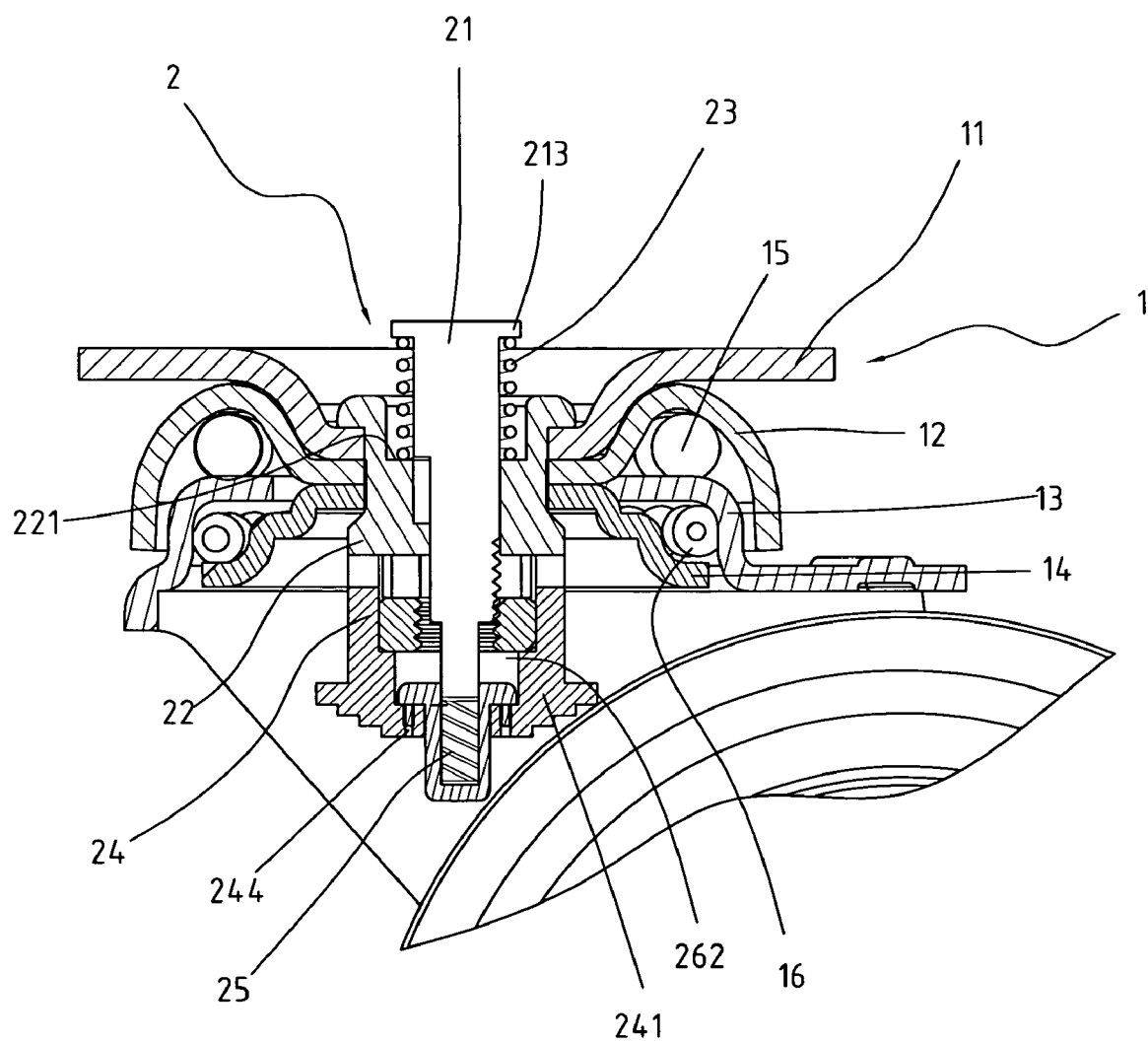
FIG. 6 is a schematic view of the brake caster in action just after a stroke adjustment to restore the braking.

When the handle bar of the hand cart is released, the rebounding force of the spring is translated to a mechanical force that exerts on the brake caster to cause the king pin 21 to move downward and push against the plunger block 24, so the cone-shaped brake pad 241 will press against the rubber of the wheel 3 to stop the moving hand cart as shown in FIG. 6.

When the rubber level of the wheel is getting low and the braking becomes somewhat ineffectual, it is necessary to adjust the stroke distance of the brake. The user may use a finger to press down the bottom end of the catch/release button 26. As the catch spring 25 is compressed, all the lock pins 262 are disengaged from the pin holes 244 as shown in FIG. 5, and the catch/release button 26 is released from the plunger block 24. This allows the user to twist in the plunger block 24 around the neck of the king pin 21 lengthwise to bring the brake pad 241 closer to the rim of the wheel 3. After the stroke adjustment is finished, the external force may be removed, and the catch/release button is again latched onto the plunger block 24 by rebounding force of the catch spring 25, since the lock pins 262 are again engaged in the pin holes 244. After appropriate adjustment of the gap between the brake pad 241 and the wheel 3, the chain action through the king pin 21, plunger block 24 and brake pad 241 can produce good braking once again as shown in FIG. 6. Therefore the stroke distance of the brake can be adjusted according to different levels of rubber on the wheel. The service life of the caster can be effectively prolonged without numerous replacements of the wheels, and the maintenance costs for the hand carts can be reduced considerably as compared with the conventional method that simply replaces the wheels every time the wheels of the casters are worn down.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A brake caster with a stroke adjustment mechanism, comprising:

a retainer having a center hole;

a king pin held by the retainer and having outward threads formed around a neck thereof;

a spring coil fitted onto an upper part of the king pin, the king pin being first fitted with the spring coil and then being inserted through the center hole of the retainer;

a catch/release button having a top flange, a blind hole formed at a center axis, and multiple lock pins disposed on a back side of the flange and extending downward;

a catch spring placed in the blind hole of the catch/release button;

a brake pad having a step structure, and having an inner ring having a plurality of pin holes;

a plunger block having a center hole that leads to the brake pad and which receives the catch/release button, inner walls of the plunger block defining a polygonal ring, the brake pad being installed on a bottom end of the plunger block, the plurality of pin holes of the brake pad corresponding to the lock pins on the catch/release button when the catch/release button is inserted into the plunger block; and a polygonal lock nut with inward threads that engage with the outward threads of the king pin, and being disposed in the polygonal ring of the plunger block;

wherein the catch spring is first placed in the blind hole of the catch/release button, and then the catch/release button is inserted through the center hole of the plunger block to allow the lock pins to be inserted into respective pin holes on the inner ring of the brake pad, and then the polygonal lock nut is fitted into the polygonal ring directly over the catch/release button in the center hole of the plunger block, and then the king pin fitted with the spring coil is inserted through the center hole of the retainer and the polygonal lock nut, and then the plunger block being fitted with the polygonal lock nut is slipped over the neck end of the king pin and twisted in to engage the outward threads of the king pin with the inward threads of the polygonal lock nut, when the plunger block and the catch/release button are assembled.

2. The brake caster with a stroke adjustment mechanism as claimed in claim 1, wherein the polygonal ring is indented near a mouth of the plunger block to accommodate the polygonal lock nut.

3. The brake caster with a stroke adjustment mechanism as claimed in claim 1, wherein the pin holes are formed in parallel and arranged on the inner ring surrounding a the center hole of the brake pad.

4. The brake caster with a stroke adjustment mechanism as claimed in claim 1, wherein a diameter of the flange is larger than a length of the catch/release button.

* * * * *